US008886804B2

(12) United States Patent
Osmond

(10) Patent No.: US 8,886,804 B2
(45) Date of Patent: Nov. 11, 2014

(54) METHOD FOR MAKING INTELLIGENT DATA PLACEMENT DECISIONS IN A COMPUTER NETWORK

(75) Inventor: Roger Frederick Osmond, Littleton, MA (US)

(73) Assignee: Pi-Coral, Inc., San Jose, CA (US)

( * ) Notice: Subject to any disclaimer, the term of this patent is extended or adjusted under 35 U.S.C. 154(b) by 369 days.

(21) Appl. No.: 12/786,131

(22) Filed: May 24, 2010

(65) Prior Publication Data

US 2010/0306371 A1 Dec. 2, 2010

Related U.S. Application Data

(60) Provisional application No. 61/180,991, filed on May 26, 2009.

(51) Int. Cl.
| | | |
|---|---|---|
| *G06F 15/173* | (2006.01) | |
| *G06F 17/00* | (2006.01) | |
| *G06N 5/02* | (2006.01) | |
| *H04L 29/08* | (2006.01) | |
| *H04N 21/231* | (2011.01) | |
| *H04N 21/00* | (2011.01) | |
| *G06F 17/30* | (2006.01) | |
| *G06F 11/14* | (2006.01) | |

(52) U.S. Cl.
CPC .......... *H04L 67/1095* (2013.01); *H04N 21/231* (2013.01); *H04N 21/00* (2013.01); *H04L 67/1023* (2013.01); *G06F 17/30575* (2013.01); *G06F 11/1492* (2013.01); *H04L 67/101* (2013.01); *H04L 29/0854* (2013.01); *H04L 67/1008* (2013.01)
USPC .............................. 709/226; 706/47; 707/626

(58) Field of Classification Search
CPC ............ G06F 11/1492; G06F 17/3021; G06F 17/30575; H04L 67/1095; H04L 29/0854

USPC ................. 709/226, 224, 229, 232, 240, 249; 718/104; 707/626
See application file for complete search history.

(56) References Cited

U.S. PATENT DOCUMENTS

| | | | | |
|---|---|---|---|---|
| 6,256,675 | B1 * | 7/2001 | Rabinovich | 709/241 |
| 6,463,454 | B1 * | 10/2002 | Lumelsky et al. | 718/105 |
| 6,466,980 | B1 * | 10/2002 | Lumelsky et al. | 709/226 |
| 8,087,025 | B1 * | 12/2011 | Graupner | 718/104 |
| 2003/0074453 | A1 * | 4/2003 | Ikonen | 709/228 |

(Continued)

OTHER PUBLICATIONS

Isiklar et al. Using a Multi-Criteria Decision Making Approach to Evaluate Mobile Phone Alternatives, 2007, *Computer Standards & Interfaces* 29:265-274.

Fenton, Norman and Wei Wang, "Risk and Confidence Analysis for Fuzzy Multicriteria Decision Making", Knowledge-Based Systems 19.6 (2006): 430-437.

(Continued)

*Primary Examiner* — Chirag R Patel
*Assistant Examiner* — Aftab Nasir Khan
(74) *Attorney, Agent, or Firm* — Pepper Hamilton LLP

(57) ABSTRACT

A method for making data placement decisions in a computer network uses multiple factors comprising social rules (rules, factors and criteria common to all participating nodes and intended to benefit the community of nodes), as well as rules, factors and criteria driven by individual self-interest of the participating nodes. The method calls for each node to act in a semi-autonomous manner, without the need for a central coordinating node. By considering multiple factors fully, and not eliminating factors by a sequence of True/False decisions, the method may arrive at optimal decisions and may generate a ranked list of node candidates.

12 Claims, 3 Drawing Sheets

*Replication Logic Flow*

(56) References Cited

U.S. PATENT DOCUMENTS

| | | | |
|---|---|---|---|
| 2004/0210565 A1* | 10/2004 | Lu et al. | 707/3 |
| 2005/0216428 A1* | 9/2005 | Yagawa | 707/1 |
| 2005/0283487 A1* | 12/2005 | Karlsson et al. | 707/100 |
| 2007/0156842 A1* | 7/2007 | Vermeulen et al. | 709/217 |
| 2008/0168015 A1 | 7/2008 | Thie et al. | |
| 2008/0313328 A1* | 12/2008 | Dahlin et al. | 709/224 |
| 2009/0048994 A1* | 2/2009 | Applebaum et al. | 706/45 |
| 2010/0299298 A1 | 11/2010 | Osmond | |
| 2010/0306371 A1 | 12/2010 | Osmond | |
| 2010/0325476 A1* | 12/2010 | Zhang et al. | 714/4 |
| 2012/0016907 A1* | 1/2012 | Ikeda et al. | 707/783 |
| 2013/0054518 A1* | 2/2013 | Anglin et al. | 707/610 |

OTHER PUBLICATIONS

Zavadskas, Edmundas Kazimieras, Friedel Peldschus, and Zenonas Turskis, "Multi-criteria Optimization Software LEVI-4.0-A Tool to Support Design and Managment in Construction", 25th International Symposium on Automation and Robotics in Construction ISARC-2008 in EK Zavadskas A. Kaklauskas MJ Skibniewski (eds.). in The 25th International Symposium on Automation and Robotics in Contruction.

Bitarafan, M.R. and M. Ataei, "Mining Method Selction by Multiple Criteria Decision Making Tools," The Journal of the South African Institute of Mining and Metallurgy 104.9 (2004); 493-498.

* cited by examiner

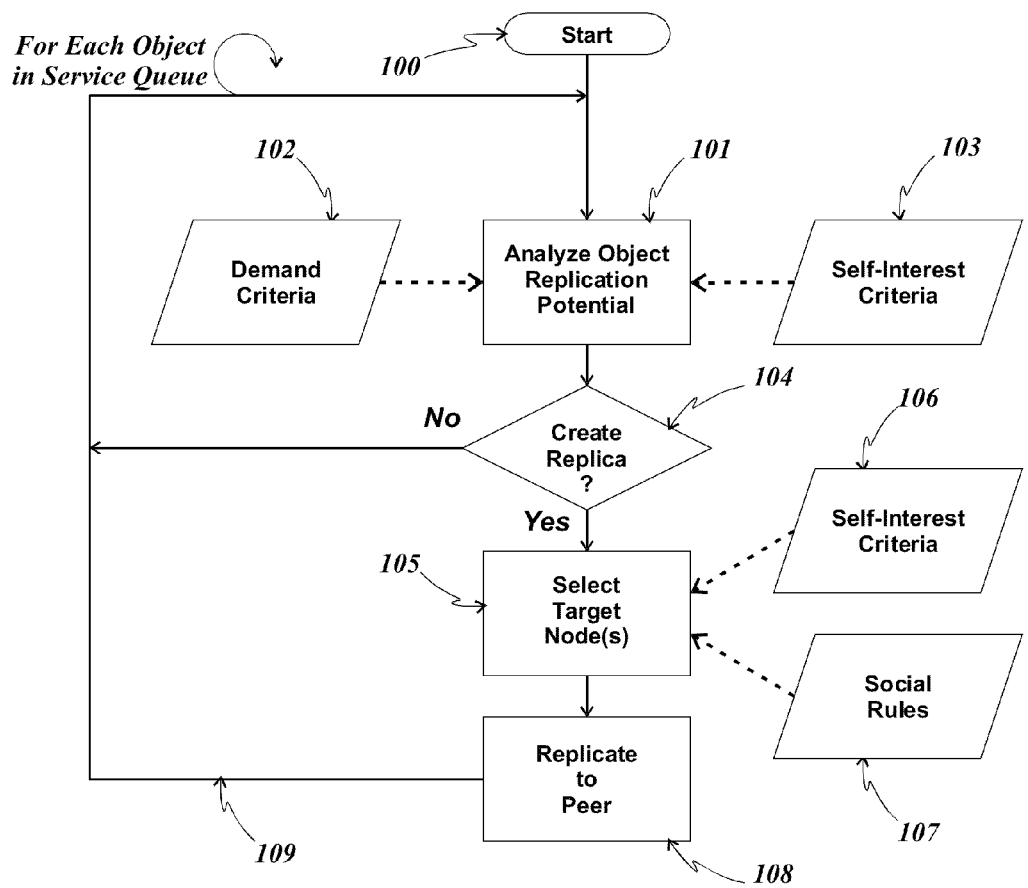
*FIG. 1 - Replication Logic Flow*

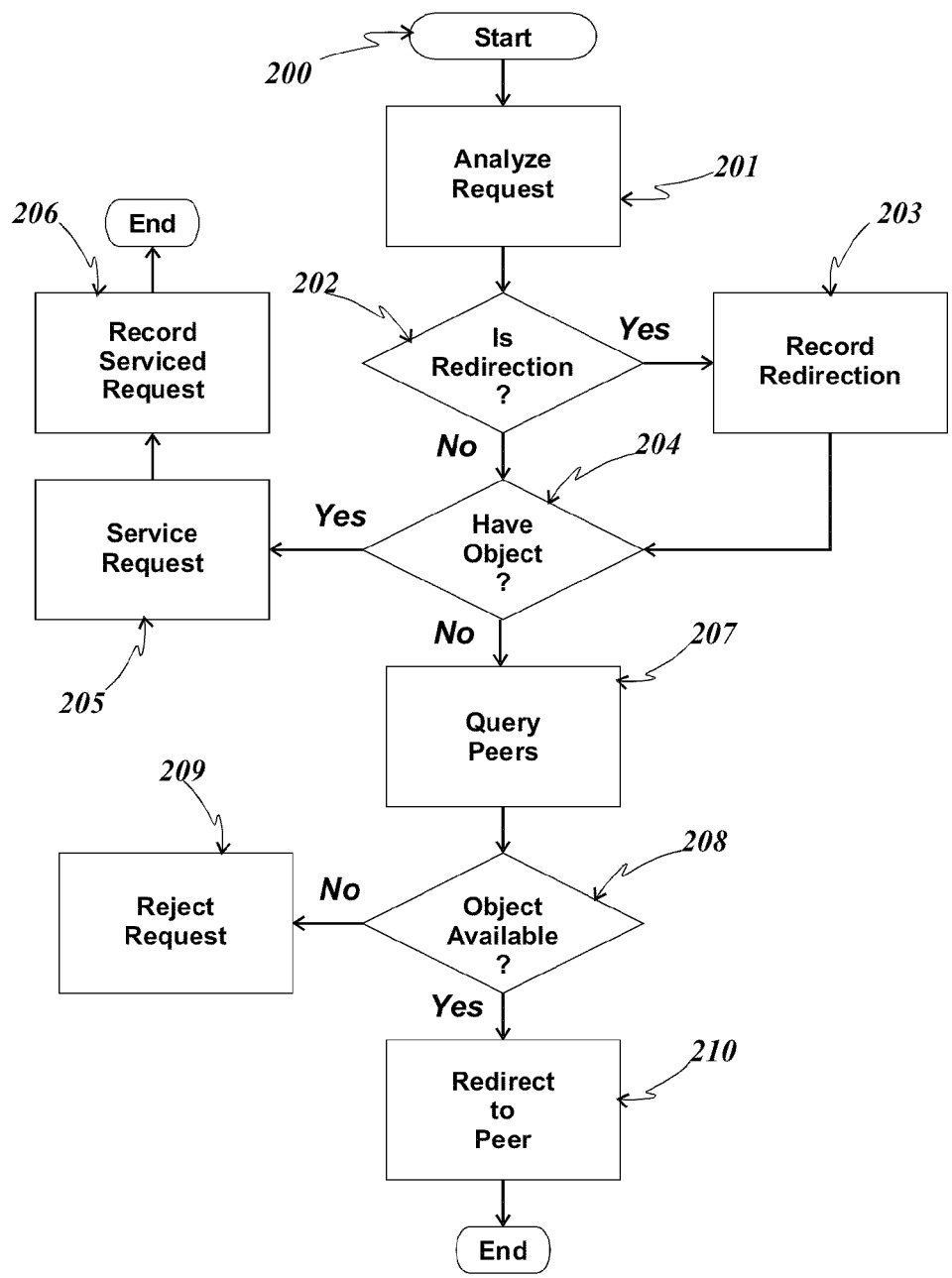
*FIG. 2 - Request Redirection Logic Flow*

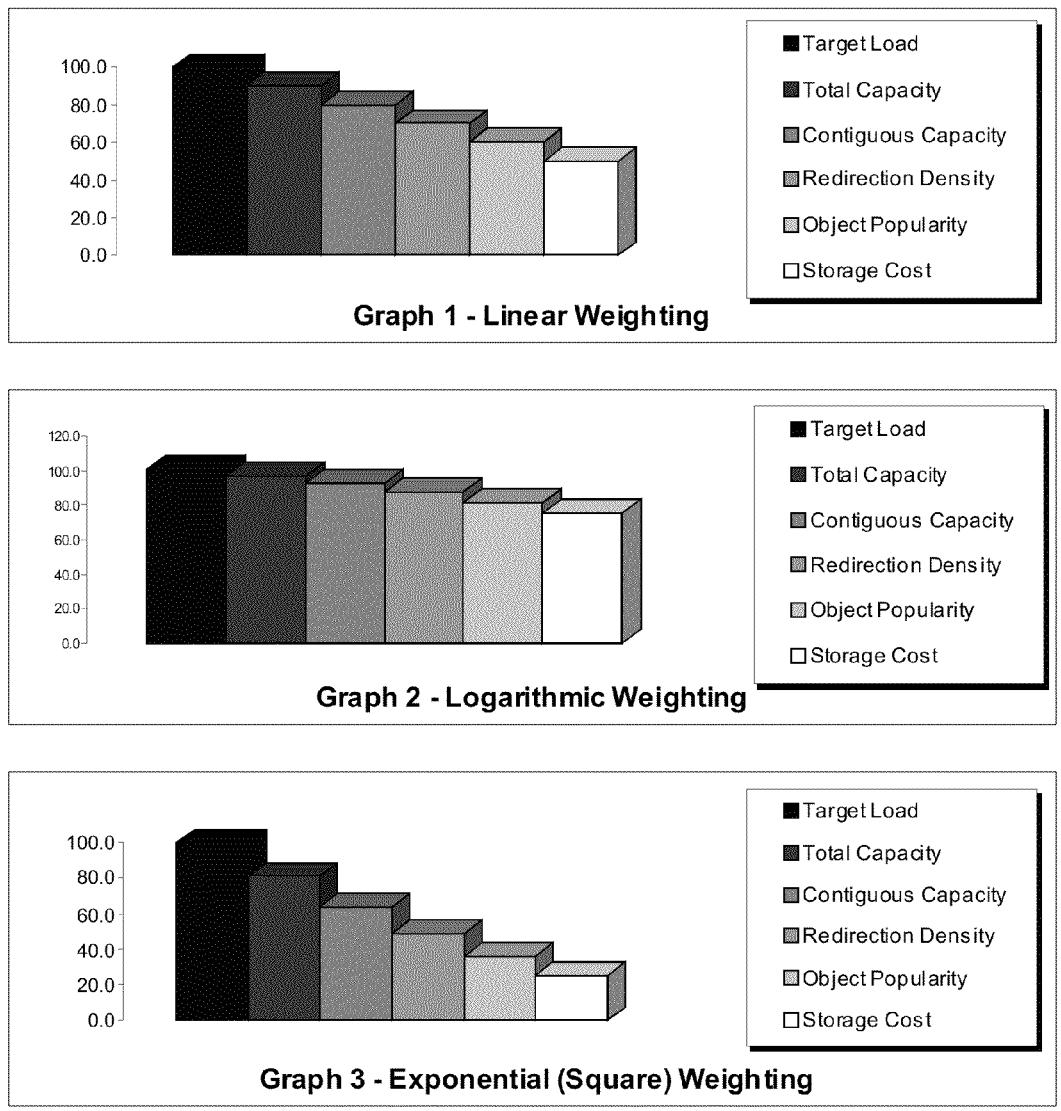
*FIG. 3 - Criteria Weighting*

METHOD FOR MAKING INTELLIGENT DATA PLACEMENT DECISIONS IN A COMPUTER NETWORK

This invention claims priority to U.S. Provisional Patent Application No. 61/180,991 entitled "Method for making intelligent data placement decisions in a computer network" filed May 26, 2009.

CROSS-REFERENCE TO RELATED APPLICATIONS

The method described in the present application is based on and incorporates in its entirety co-pending U.S. application Ser. No. 12/782,495 entitled "Method for making optimal selections based on multiple objective and subjective criteria" [OSMOND01], by Roger F. Osmond, filed on May 18, 2010.

BACKGROUND OF THE INVENTION

This invention relates generally to computer software. Aspects of this invention also relate more specifically to network software, data storage and replication.

Data storage systems are responsible for the safety and integrity of the data they host. One common method used to protect data from loss is data replication. Data replication makes additional copies of data, often on different storage nodes. When there are multiple copies of a single data item, the probability of loss of all of the copies is much lower than for data on a single node.

An added benefit of replication, and often a major motivation for it, is improved overall read performance. By having copies of data on multiple nodes, read activity in the network is less likely to concentrate on one or very few nodes, and will likely be more balanced across the nodes. In larger scale networks spanning different regions of geography, connectivity, organization and administration, having one or more copies within a region can improve responsiveness for applications executing in that region.

It would be advantageous to have a method by which data replicas would be placed intelligently amongst the nodes of a network, without excessive management overhead or complexity, and with reasonable efficiency.

BRIEF SUMMARY OF THE INVENTION

In accordance with the present invention, a method for making data placement decisions in a computer network is provided which uses multiple factors comprising social rules and the self-interest of the participating nodes. The method calls for each node to act in a semi-autonomous manner, without the need for a central coordinating node.

LIST OF TABLES

Table 1 depicts an example candidate/criterion matrix of nodes.

BRIEF DESCRIPTION OF THE SEVERAL VIEWS OF THE DRAWING

The present invention may be better understood by referring to the following description taken in conjunction with the accompanying drawings in which:

FIG. 1 depicts a logic flow representing the present invention's method for data placement (replication) decision making, FIG. 2 depicts a simplified request processing flow, and FIG. 3 depicts the effects of different weighting algorithms on prioritized criteria.

DETAILED DESCRIPTION OF THE INVENTION

The method of the present invention provides to each participating node a set of rules of conduct, "social rules". Each node acts according to these social rules when making decisions regarding data placement. Each node also has to consider demand-side criteria and self-interest criteria. FIG. 1 depicts a (simplified) flow of logic that a storage node executes when making data placement decisions. Item 101 denotes a step in the logic at which the node decides whether or not a replica should be created for that object. At this step, a node considers demand criteria (Item 102) like object popularity and replica count. It also considers factors that reflect its own self-interest (Item 103) such as its current load, the overall density of requests being redirected to it, and its own storage costs.

If warranted, then the node continues (Item 105) with the replication process by selecting the best target node or nodes from a candidate list (peer nodes). The selection process considers multiple criteria including those related to self-interest (Item 106) and those imposed by social rules (Item 107).

The preferred embodiment treats all replicas as peers, though a scheme by which there are primary and subordinate replicas is also possible. The preferred embodiment implements a redirection mechanism in which, upon a node receiving a request for an object not present locally on that node, the receiving node redirects the request to a peer node on which the requested object is present, as illustrated in FIG. 2.

Self-interest factors include Storage Cost, Load, Redirection Density and Object-Node Affinity. This is a representative list only, and other factors are likely. Storage Cost relates to the actual cost of the storage devices and of storing data on them (including equipment purchase/lease, and operational costs). For example, a SAS (Serial-Attached SCSI) or SCSI (Small Computer System Interface) drive might be more costly than a SATA (Serial Advanced Technology Attachment) drive of similar capacity. Load relates to the current, recent and historical load on the storage node making the decision. Redirection Density relates to the recent and historical frequency of redirection requests for the object being considered.

Object-Node Affinity, as it pertains to the present invention, is a reflection of the completeness of the object's context on the decision-making node. In a simple case, an object's context would include the object's container (e.g. a folder or directory) and with it, the other objects that could be in that container. The degree of completeness of a context (e.g. the extent to which that container is already populated) can be considered as a factor indicating the likelihood that other data (e.g. other objects from the same container) would be requested.

For example, a storage system might arrange data objects into containers. A node might hold a significant portion of the objects in a container. A second node might have a high incidence of requests for objects in that container, forwarding or redirecting those requests to the first node. Based on a combination of social rules and self-interest, the first node might, over time, create on the second node replicas of a number of objects in that object's container. At some point (e.g. at predetermined intervals, or in response to a request), the first node might assess the extent to which the second node resembles the first, with respect to the completeness of the container. The first node then, perhaps to reduce the anticipated density of future requests for objects in that container, may decide to create on the second node replicas of the remaining objects in that container, so long as doing so does not violate any social rules. In this manner, the first node is acting in its own self-interest to create a replica on the second node.

Social rule-based factors include Replica Min/Max, Object Popularity, and Movement Cost. This is a representative list only, and other factors are likely, including object criticality, retention policies and object age.

Replica Min/Max might be a global (i.e. all nodes, all spaces and all objects) rule, or might be qualified. It denotes the working minimum and maximum replica counts either for objects in general, or for the object being considered for replication. When the current count is at or below the minimum, then a new replica needs to be created. One of the nodes on which a replica resides would initiate creation of a new replica. When the current count is at or above the maximum, additional replicas are not required. Typically the minimum relates to service levels and the maximum is driven by cost considerations, but object popularity can factor into the equation as well.

Object popularity is the measured and/or predicted popularity of a given object. For example, a much anticipated new movie title might have a very high initial predicted popularity and so would warrant a higher number of replicas. Localized popularity might vary and the popularity of an object can change relatively quickly. Object popularity can also be used, in conjunction with storage cost, to reduce the number of replicas or to move objects (replicate then delete) to servers offering less costly storage (or both). The method of this invention then provides the benefits of a content distribution network (CDN) and hierarchical storage management (HSM), into a more comprehensive value-driven storage model.

Movement cost, while governed by social rules, relates also to self-interest. Movement cost is the relative cost of copying or moving a given object from one node to another. The cost is calculated primarily on object size relative to network bandwidth. From the social rules perspective, each storage node must behave in a way that is socially responsible, for example not burdening the network disproportionately. In other words, unless there is a compelling reason to do so, a node should not create a replica if doing so imposes an undue burden on the network (a shared resource).

Object-peer affinity is a measure of an object's affinity with a node that is a peer to the current storage node (i.e. a node that closely resembles the current node with respect to a given object's context), and is related to the object-node affinity factor for self-interest analysis. Simply stated, object-peer affinity is analogous to object-node affinity, except that object-peer affinity relates the object to a peer of the decision making node, instead of relating to the decision making node itself.

For illustration, an object might belong to a collection of objects, the overwhelming majority of which have replicas on a peer node. The node performing the analysis (the first node) might also have a strong affinity with the object in question and have a relatively low redirection density from the second node. As such, the first node would not be inclined to create a replica for that object based solely on the first node's self-interest. The object-peer affinity factor would encourage (but not mandate) the first node to create the replica.

The decision to create a replica, and on which node, is a potentially complex task. Taken singly, the factors that must be considered might result in several different decisions. The method of the present invention considers all relevant factors in its data placement decisions. It does this by exploiting and adapting a decision-making method described in [OSMOND01].

The method of the present invention assembles a matrix of decision factors (criteria) and candidate nodes to which to apply the method adapted from [OSMOND01].

TABLE 1

Example Node/Factor Matrix

| | Storage Cost | Redirection Density | Total Capacity | Contiguous Capacity | Target Load | Object Popularity | Raw Totals |
|---|---|---|---|---|---|---|---|
| Node 1 | 5 | 5 | 3 | 3 | 3 | 5 | 24 |
| Node 2 | 2 | 5 | 5 | 5 | 1 | 3 | 21 |
| Node 3 | 1 | 1 | 2 | 4 | 5 | 3 | 16 |
| Node 4 | 5 | 1 | 1 | 1 | 3 | 3 | 14 |
| Node 5 | 2 | 2 | 5 | 5 | 4 | 3 | 21 |

Table 1 shows an example decision matrix with 5 candidate nodes and 6 decision criteria (in reality there might be several more of each). Each criterion has been given a relative value through the normalization process of the decision making method, where a value of 5 (for 5 candidates) is the highest and 1 is the lowest. It is important to note that factors such as the decision-making node's load and the object's affinity with the current node are absent from that table, as they are the same regardless of the candidate node, and would be considered in a separate step that decides whether or not to create a replica at all (See FIG. 1, Item 101).

The raw totals in Table 1 seem to indicate that Node 1 has the highest points and is therefore the preferred target. According to the method in [OSMOND01], the criteria would be sorted by priority and then weighted to produce a more meaningful decision (the criteria in Table 1 are not sorted in any particular way). The raw values in Table 1 imply that Node 1 is the preferred target for a replica. Table 2 lists the raw values of Table 1 with various weightings applied. In each case, Node 1 is the top candidate. The weightings apply to the prioritized criteria to reflect more accurately the relative importance in decision making, as described in [OSMOND01]. Raw totals are un-weighted and therefore do not reflect criteria priority. Any number of algorithms could be used to apply priority weighting, and the ones used in Table 2 are for illustration.

TABLE 2

Example Weighted Node/Factor Matrix

|        | Raw | Linear | Log    | Exponential |
|--------|-----|--------|--------|-------------|
| Node 1 | 24  | 1830.0 | 2147.4 | 1477.0      |
| Node 2 | 21  | 1610.0 | 1890.6 | 1281.0      |
| Node 3 | 16  | 1080.0 | 1365.7 | 760.0       |
| Node 4 | 14  | 1070.0 | 1250.8 | 877.0       |
| Node 5 | 21  | 1520.0 | 1845.6 | 1146.0      |

Changing the priority of the criteria has an interesting effect on the outcome of the decision making process.

TABLE 3

Alternate Criteria Priorities

| Original            | Alternative         |
|---------------------|---------------------|
| Storage Cost        | Target Load         |
| Redirection Density | Total Capacity      |
| Total Capacity      | Contiguous Capacity |
| Contiguous Capacity | Redirection Density |
| Target Load         | Object Popularity   |
| Object Popularity   | Storage Cost        |

By changing the priority from that in Table 1 to Target Load, Total Capacity, Contiguous Capacity, Redirection Density, Object Popularity and then Storage Cost (Table 3), the preferred node changes for the Exponential weighting option, as shown in Table 4, from Node 1 to Node 5, and rather decisively.

TABLE 4

Example Weighted Node/Factor Matrix with Alternate Priority

|        | Raw | Linear | Log    | Exponential |
|--------|-----|--------|--------|-------------|
| Node 1 | 24  | 1710.0 | 2090.7 | 1285.0      |
| Node 2 | 21  | 1580.0 | 1878.0 | 1228.0      |
| Node 3 | 16  | 1300.0 | 1473.9 | 1100.0      |
| Node 4 | 14  | 970.0  | 1199.9 | 727.0       |
| Node 5 | 21  | 1670.0 | 1918.2 | 1381.0      |

The Exponential weighting option in the example gives significantly greater importance to the higher priority criteria than to the lower priority criteria. This might be desirable when a single factor is especially compelling. In other contexts, a less severe weighting algorithm might be appropriate. FIG. 3 depicts the effects of different weighting algorithms on prioritized criteria in the example, with Graph 3 in FIG. 3 depicting the effect of the Exponential weighting on the criteria priority reflected in Table 4.

The rules that govern criteria priority and weighting are defined for each node in the network and are typically the same for each. In some cases, some nodes might be special in some way (e.g. nodes bridging multiple subnets or nodes with different service level agreements), and therefore might have different rules than the other nodes in that network.

By being able to make well-informed data placement decisions, balancing demand-side and supply-side factors, storage nodes are able to achieve higher performance, higher service levels, and higher capacity utilization. This capability would be of significant benefit, but not be limited to, content-distribution networks, video-on-demand services and Internet data services in general.

Embodiments provide for various methods for generating data placement decisions in a computer network. For instance, a first example method for generating data placement decisions in a computer network comprises: wherein multiple criteria, rules or factors may be considered, prioritized and weighted using one or more algorithms, wherein such criteria, rules or factors may comprise shared social rules that govern the behavior of all participating nodes, per-object criteria (also called demand criteria) and criteria that relate to a participating node's self-interest and, wherein the criteria, rules and factors to consider may be predefined, assigned, or derived from current data and, wherein algorithms for weighting criteria, rules and factors may be predefined, assigned or derived from current data.

A second example method comprises the first example method, wherein data placement involves whole objects, composites of whole objects, parts of whole objects, and composites of parts of whole objects. A third example method comprises the first example method, wherein a participating node may consider object popularity and replica count, and may also consider factors that reflect its own self-interest such as its current load, the overall density of requests being redirected to it, and its own storage or networking costs. A fourth example method comprises the first example method, wherein a participating node may consider the relative affinity of an object to other objects stored by a participating node, wherein an object's affinity to other objects includes but is not limited to: a function of the completeness of the set of objects to which an object belongs or, a function of the frequency with which requests for an object occur with or near requests for other objects. A fifth example method comprises the first example method, wherein performance levels in the network, in terms of overall throughput, node utilization, latency or other factors may be considered. A sixth example method comprises the first example method, wherein object or data set resilience, robustness, reliability or availability levels may be considered. A seventh example method comprises the first example method, wherein there may be no need for a central coordinating node. An eighth example method comprises the first example method, wherein a participating node asks another participating node to accept responsibility for an object or set of objects. A ninth example method comprises the first example method, wherein a participating node (first node), upon receiving a request for an object or set of objects which the first node does not have, the first node may redirect the request to a peer node on which the object or set of objects is known to be stored, or is likely to be stored and, wherein such redirection is recorded such that a history of redirection requests, relating to nodes, to objects and to sets of objects, may be used as a factor for subsequent data placement decisions. A tenth example method comprises the first example method, wherein data placement decisions may be triggered by events including but not limited to time-related events, access events, threshold events in the network or on one or more participating nodes. An eleventh example method comprises the first example method, wherein all relevant criteria are considered in all calculations, without prematurely eliminating a criterion, rule or factor.

What is claimed is:

1. A computer-implemented method for making a data placement decisions in a computer network, the method comprising:

providing a plurality of self-interest criteria defined for each of a plurality of computer network nodes of the computer network; wherein the plurality of self-interest criteria comprises at least two of the following: a storage cost criterion calculated based on object size, a load criterion, a redirection density criterion, and an object-node affinity criterion;

providing a plurality of social criteria defined for each of the plurality of computer network nodes, wherein each of the plurality of network nodes is configured to act in a semi-autonomous manner, without the need for a central coordinating node;

assigning weights to the plurality of self-interest criteria and the plurality of social criteria;

generating the data placement decision responsive to a computer network event, wherein generating the data placement decision comprises selecting at least one target node based on the plurality of self-interest criteria and the plurality of social criteria;

communicating a request to the at least one target node based on the computer network event;

receiving the request for at least one data object at a first computer network node of the plurality of computer network nodes, the at least one data object being stored on at least one of the plurality of computer network nodes;

analyzing, via the first computer network node, the plurality of self-interest criteria for the first computer network node and a plurality of demand criteria associated with the at least one data object to determine whether to replicate the at least one data object by using a matrix of decision factors;

selecting, via the first computer network node, at least one target node with a highest points value in the matrix as preferred target node for storing the at least one replica based on the weighted plurality of self-interest criteria for the first computer network node and the weighted plurality of social criteria responsive to a determination to replicate the at least one data object;

generating at least one replica of the at least one data object; and storing the at least one replica on the at least one target node into a container.

2. The computer-implemented method of claim 1, wherein the target node is selected from a plurality of nodes comprising peers of the at least one computer network node.

3. The computer-implemented method of claim 1, wherein the plurality of self-interest criteria comprises a storage cost criterion comprising at least one of the following: a cost of at least one storage device and a cost of storing the at least one data object on at least one storage device.

4. The computer-implemented method of claim 1, wherein the plurality of self-interest criteria comprises a load criterion comprising a current load and a historical load of at least one of the plurality of computer network nodes.

5. The computer-implemented method of claim 1, wherein the plurality of self-interest criteria comprises a redirection density criterion comprising a recent frequency of redirection requests for the at least one data object and a historical frequency of redirection requests for the at least one data object.

6. The computer-implemented method of claim 1, wherein the plurality of self-interest criteria comprises an object-node affinity criterion comprising a measure of an object population of a container storing the at least one data object.

7. The computer-implemented method of claim 1, wherein the plurality of social criteria comprises two or more of the following: a replica minimum/maximum rule, an object popularity rule and a movement cost rule.

8. The computer-implemented method of claim 7, wherein the plurality of social criteria comprises a replica minimum/maximum rule comprising a minimum replica count within the computer network and a maximum replica count within the computer network.

9. The computer-implemented method of claim 7, wherein the plurality of social criteria comprises an object popularity rule comprising at least one of the following: a measured popularity of the at least one data object and a predicted popularity of the at least one data object.

10. The computer-implemented method of claim 7, wherein the plurality of social criteria comprises a movement cost rule comprising a cost of copying the at least one data object to the at least one target node.

11. A system for making data placement decisions in a computer network, the system comprising:

a plurality of computer network nodes;

a first computer network node of the plurality of computer network nodes, the first computer network node being operative to execute a data placement decision application, the data placement decision application being configured to:

access a plurality of self-interest criteria, the plurality of self-interest criteria being weighted and defined for each of the plurality of computer network nodes of the computer network, wherein the plurality of self-interest criteria comprises at least two of the following: a storage cost criterion calculated based on object size, a load criterion, a redirection density criterion, and an object-node affinity criterion, access a plurality of social criteria, the plurality of social criteria being weighted and defined for each of the plurality of computer network nodes, wherein each of the plurality of network nodes is configured to act in a semi-autonomous manner, without the need for a central coordinating node, receive a request for at least one data object stored on at least one of the plurality of computer network nodes, analyze the plurality of self-interest criteria for the first computer network node and the plurality of demand criteria associated with the at least one data object to determine whether to replicate the at least one data object by using a matrix of decision factors, select at least one target node with a highest value in the matrix as preferred target node for storing the at least one replica based on the weighted plurality of self-interest criteria for the first computer network node and the weighted plurality of social criteria responsive to a determination to replicate the at least one data object, generate the data placement decision responsive to a computer network event, wherein generating the data placement decision comprises selecting at least one target node based on a plurality of self-interest criteria and a plurality of social criteria, communicate the request to the at least one target node based on the computer network event, generate at least one replica of the at least one data object, and store the at least one replica on the at least one target node into a container.

12. The computer-implemented method of claim 11, wherein the plurality of social criteria comprises two or more of the following: a replica minimum/maximum rule, an object popularity rule, and a movement cost rule.

* * * * *